June 20, 1944.  A. GRAF  2,351,955
GRAVITY METER
Filed Feb. 4, 1941
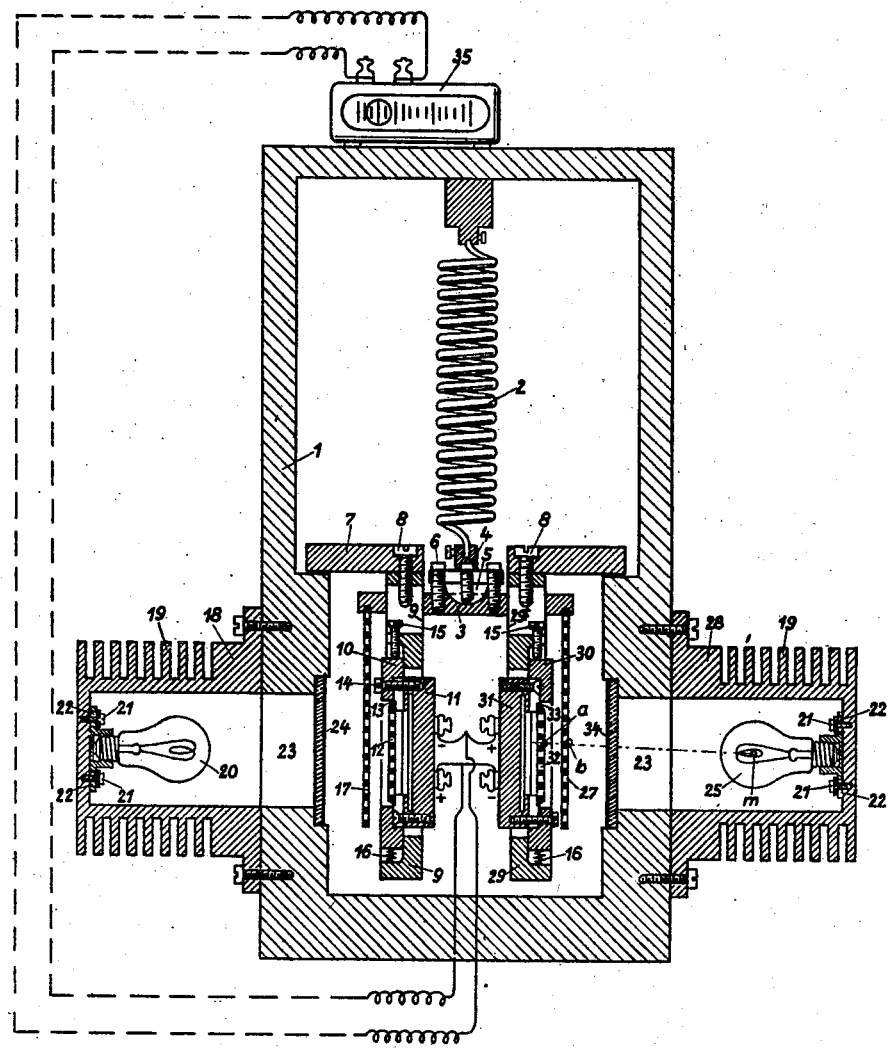
Inventor:
Anton Graf
By A. D. Adams
Attorney Patented June 20, 1944

2,351,955

UNITED STATES PATENT OFFICE 2,351,955

GRAVITY METER

Anton Graf, Berlin-Steglitz, Germany; vested in the Alien Property Custodian

Application February 4, 1941, Serial No. 377,395
In Germany December 30, 1939

5 Claims. (Cl. 265—1.4)

It has previously been proposed to construct gravity meters in which the displacement caused by variations in gravity of an elastically supported mass serves to control the exposure of photo-cells arranged in differential connection. In such optic-electric gravity meters a preferably perforated diaphragm capable of being displaced together with the mass is displaced relative to a fixed diaphragm, by which means the exposure of a photo-cell system is varied so that the difference between the photo-cell currents (voltages) is a measure of the mass displacement and the gravity variation, respectively. The present invention relates to the constructive development of such an instrument for rendering it suitable for field use.

One of the principal considerations in the construction of such instruments is that of minimizing any temperature influence from the heat producing sources of light upon the extremely temperature-sensitive parts of the instrument, i. e. the photo-cells and the suspension spring.

According to the invention such protection against temperature influences is facilitated by arranging the photo-cells back to back in the interior of the instrument so as to be capable of exposure to sources of light arranged outside of said instrument.

A further point to be considered is, however, that the photo-cells in the interior of the instrument, and particularly the diaphragms between these and the sources of light, are easily and accurately adjustable. For this purpose they are arranged in such manner that a perforated diaphragm each is secured so as to be turnable and vertically displaceable in front of each photo-cell, a similarly perforated second diaphragm being suspended in front of said first diaphragms.

The mounting of the inner diaphragm may in this connection be firmly connected with that of the respective photo-cell and is preferably guided in a recess of a slide gliding in turn in a vertical guide of a frame-like support. In this way it is possible to adjust the fixed diaphragm by means of turning and vertical displacement into a desired position relative to the diaphragm secured on the mass, and more particularly to align the two diaphragms.

It is, however, necessary likewise to provide for the possibility of adjusting the movable diaphragms, as will be seen from the following. The instruments are constructed so as to indicate a measuring value when the parallel adjusted diaphragms are displaced relative to one another in the plane which is normal to the plane determined by the perforation and the source of light. Such a relative displacement into the normal to said plane may however take place also at an inclination of the instrument and thus falsify the measurement. Hence it must be rendered possible to align by adjustment the movable diaphragms in all directions in such a way that an inclination of the instrument does not result in a displacement of the movable diaphragm into the normal to the plane determined by the perforation and the source of light. The proper position of the movable diaphragm most adequately fulfilling this condition cannot be previously determined but has to be ascertained in practice by means of adjustment. In order to provide such universal adjustment of the movable diaphragms it is advantageous to connect the diaphragms rigidly with the mass and to fix the mass at a clamping member at any desired inclination to the spring axis, said clamping member being arranged at one end of the suspension spring. Such an arrangement is constructionally much simpler than that of having the diaphragms fixed to the mass so as to be universally adjustable, although in principle this may serve equally well. A further possibility of adjustment may be provided by arranging the sources of light so as to be adjustable vertically relative to the first diaphragms. By vertical displacement of the incandescent lamp the plane determined by the source of light and the diaphragms may be displaced and more easily aligned when movements of the movable diaphragms occur due to an inclination of the instrument.

An embodiment of the invention is described in the following, reference being had to the accompanying drawing representing a vertical section through the instrument.

In a casing 1 there is suspended by a spiral spring 2 a mass 3 of a gravity meter. Said mass is fixed to the spring 2 by means of a mounting appliance 4 possessing a spherical surface 5 serving as support for the mass 3. By means of four adjusting screws 6 the mass 3 may be mounted so as to be universally inclined relative to the spring axis. A support 7 is inserted in the casing 1, two frames 9, 29 being fixed on said support by means of screws 8. Two further frames 10, 30 are slidably arranged in vertical guides in the frames 9, 29, respectively, the frames 10, 30 serving as supports for the photo-cells 11, 31, respectively. Said photo-cells are arranged back to back with their light-sensitive front part turned outwardly. They are arranged in a series additive connection and are in communication with a galvanometer 35. In front of each photo-cell there are disposed—in respective recesses 13, 33 of the slides 10, 30 carrying the photo-cells 11, 31, respectively—diaphragms 12, 32, respectively, and in such manner as to be turnable in the respective slides 10, 30 as well as displaceable in the respective frames 9, 29. Screws 14 serve to secure the respective diaphragms 12, 32, and set screws 15 and countersprings 16 are provided to fix the slides 10, 30, respectively.

A second pair of diaphragms 17, 27 is arranged in front of the diaphragm pair 12, 32, respectively. The former is however rigidly connected with the mass 3. The diaphragms 17, 27 are universally inclinable together with the mass relative to the respective diaphragms 12, 32 by means of the spherical mounting surface 5.

Two small pot-shaped casings 18, 28 having flanges are screwed on to the sides of the casing 1, the surface of said cases being increased by cooling ribs 19. Sources of light 20, 25, respectively, are screwed on to the inner bottoms of said cup-shaped casings 18, 28. The screws serving to fix said sources of light are arranged in slots 22 so as to allow for a vertical displacement of said sources of light.

The casing 1 possesses windows 23 permitting the passage of rays of light. Said windows are provided with heat protecting glass plates 24, 34 for shutting off the interior of the casing 1 from the respective chambers of the lamp casings 18, 28.

The mode of operation of a gravity meter according to the invention is described in the following. Upon a displacement of the mass 3 the diaphragms 17, 27, respectively, rigidly connected therewith are displaced along with it relative to the diaphragms 12, 32, fixedly arranged in the casing 1. This results in a variation in the exposure of the photo-cells 11 and 31 corresponding to the relative displacement of the diaphragms 12, 17 and 32, 27, respectively. Such variation is transmitted by the photo-cells as an electric current and/or voltage, which constitutes a measure of the displacement of the mass 3 and therefore of the force of gravity.

As the displacements to be determined in this way are exceedingly small, it is essential to reduce as much as possible the possibility of the diaphragms, photo-cells and especially the spring from being influenced by temperature conditions. To this end the heating effect of the lamps 20, 25 arranged outside the casing 1 is diverted by means of the cooling ribs 19. In addition the circulation of heated air in the interior of the casing 1 is prevented by the windows 23, 23, the glass 24, 24 of which is of a non-conducting kind as regards heat.

The photo-cells 11, 31 and the diaphragms 12 and 32, respectively, are adjusted by displacing the respective diaphragms 12 and 32 relative to the respective lamps 20, 25. The vertical position of the diaphragms 17 and 27 corresponds to the zero position of the mass 3. The inner diaphragms 12, 32, respectively, are shifted into the position required for producing a differential effect by vertical displacement of the respective slides 10, 30 in the frames 9, 29. In order to effect parallel adjustment of the diaphragms, the inner diaphragms 12, 32 are turned in the respective recesses 13, 33 in the slides 10, 30.

Additional appliances are further provided for eliminating the influences exerted on the measuring operations by inclinations of the instrument. At an inclination of the casing 1 the diaphragms 17, 27 rigidly fixed on the mass 3 are displaced relative to the respective diaphragms 12, 32 as the mass is pendulously suspended. Such a displacement, however, must not be permitted to cause variations in the exposure of the photo-cells 11, 31, i. e. to simulate a displacement of the mass 3 as being due to differences in gravity. To this end the perforation is not arranged rectilinearly but in circular arcs, the center of these arcs being the fictitious pivot point of the pendulously suspended mass 3. In addition the width of the slides of the movable diaphragms 17, 27 is so chosen that there is no possibility of the diaphragms 12, 32 being uncovered by the respective diaphragms 17, 27 at a lateral displacement of these due to an inclination of the instrument.

The above mentioned means do not however suffice to render the instrument unresponsive to inclination. This can only be achieved by ensuring that the movable diaphragms 17, 27 at a displacement of the mass 3 due to inclination of the casing 1 if at all possible do not move vertically to a plane determined by the perforation of the respective diaphragms 12, 32 and the lamps 20, 25. Such a plane is formed for instance by the edge of a slot of the diaphragm 32 and the center $m$ of the lamp 25. Thus, at an inclination of the instrument the controlling edge $b$ of the diaphragm 27 would have to be displaceable only in this plane determined by $a$ and $m$ or in one parallel thereto.

Now the spherical mounting appliance 5 having set screws 6 is provided to effect the adjustment of the respective diaphragms 17, 27 as thereby the latter may be mounted in a position inclined relative to the spring axis with the result that errors due to inclination may in the course of practical application be reduced to a minimum. Finally, a supplementary adjustment may be effected by displacement of the plane $a$—$m$ by shifting the point $m$, i. e. by vertical displacement of for instance the lamp 25 by shifting same in the slot 22 of its mounting.

What is claimed is:

1. A gravity meter comprising in combination a casing for the meter, a mass mounted within the meter casing for vertical displacement, spring means balancing the gravity force of said mass, an optic-electric cell system for converting light variations into electric values, said system including two cell units, a first light source emitting light towards one cell unit, a second light source emitting light towards the other cell unit, a first diaphragm arranged in each of the light paths, a second diaphragm arranged in each of the light paths and located in front of said first diaphragm, each diaphragm having apertures which permit light from the source associated therewith to pass therethrough towards the cell unit associated with the diaphragm, means for mounting said first diaphragms whereby they are adjustable in a substantially vertical direction and are adjustably turnable about a substantially horizontal axis, said second diaphragms being arranged to be displaced with said mass in such manner that upon a displacement of the mass the quantity of light reaching one of the cell units increases while the quantity of light reaching the other cell unit decreases, indicating means operatively connected to said cell system to indicate the difference between the measuring values of said two units, said two cell units being arranged back to back in spaced relation in the center of the meter casing, said meter casing being provided with openings, one for each light source, a separate lamp casing arranged outside of the meter casing opposite each opening in the meter casing and means for mounting one of said light sources in each lamp casing whereby the light source is substantially vertically displaceable relative to the first diaphragm associated therewith.

2. A gravity meter comprising in combination a casing for the meter, a mass mounted within the meter casing for vertical displacement, spring means balancing the gravity force of said mass, an optic-electric cell system for converting light variations into electric values, said system including two cell units, a first light source emitting light towards one cell unit, a second light source emitting light towards the other cell unit, a first diaphragm arranged in each of the light paths, a second diaphragm arranged in each of the light paths and located in front of said first diaphragm, each diaphragm having apertures which permit light from the source associated therewith to pass therethrough towards the cell unit associated with the diaphragm, a support fixed to the sides of said meter casing, said cell units and the first diaphragms being rigidly supported from said support in spaced relation, said cell units being located centrally of the meter casing in back to back relation and one cell unit and one first diaphragm being located on opposite sides of the axis of said spring means, second diaphragms being carried by said mass in such manner that upon a displacement of the mass the quantity of light reaching one of the cell units increases while the quantity of light reaching the other cell unit decreases, and indicating means operatively connected to said cell system to indicate the difference between the measuring values of said two units.

3. A gravity meter comprising in combination a casing for the meter, a spring suspended from the top of said casing, a mass suspended from said spring, said spring balancing the gravity force of said mass, a support within the casing, a pair of frames extending substantially vertically from said support, said frames being spaced apart and on opposite sides of the axis of the spring, slide means mounted on each frame for substantially vertical adjusting movement, an optic-electric cell system for converting light variations into electric values, said system including a cell unit carried by each slide means, said cell units being arranged back to back, a diaphragm carried by each slide means, each diaphragm being aligned with the light sensitive face of the cell unit on its respective slide and being spaced therefrom, a second pair of diaphragms rigidly suspended from said mass for movement therewith, each second diaphragm being spaced from a first diaphragm on the side of latter away from its associated cell unit, a pair of light sources carried by said meter casing, each light source aligned with a first and a second diaphragm and emitting light towards the cell unit associated with such first and second diaphragm, and each diaphragm having apertures to permit light from its respective light source to pass therethrough and onto the cell unit associated therewith, said second diaphragms being arranged to be displaced with said mass in such manner that upon a displacement of the mass the quantity of light reaching one of the cell units increases while the quantity of light reaching the other cell unit decreases.

4. A gravity meter as claimed in claim 1 wherein said second diaphragms are rigidly connected to said mass and means are provided for securing the mass to the end of said spring means at a desired inclination relative to the axis of the spring means.

5. In a gravity meter as claimed in claim 1, a clamping member fixed to the end of said spring means, said clamping member having a spherical shaped portion and said mass provided with a cup-shaped depression which seats on the spherical portion of the clamping member, and diametrically opposed screws extending through said clamping member and engaged with said mass to connect the clamping member and mass together.

ANTON GRAF.